United States Patent [19]

Yamada

[11] Patent Number: 4,511,232
[45] Date of Patent: Apr. 16, 1985

[54] AUTO-FOCUS CAMERA
[75] Inventor: Yasuyuki Yamada, Tokyo, Japan
[73] Assignee: Canon Kabushiki Kaisha, Tokyo, Japan
[21] Appl. No.: 495,426
[22] Filed: May 17, 1983
[30] Foreign Application Priority Data
May 28, 1982 [JP] Japan .................. 57-90770
May 12, 1983 [JP] Japan .................. 58-81698
[51] Int. Cl.³ .............................. G03B 13/22
[52] U.S. Cl. ....................... 354/403; 250/201
[58] Field of Search ........... 354/402, 403, 167; 250/201, 201 AF; 356/1, 4

[56] References Cited
U.S. PATENT DOCUMENTS
3,988,748 10/1976 Iura et al. .................. 354/444
4,150,888 4/1979 Filipovich .................. 354/403
4,473,287 9/1984 Fukuhara et al. .................. 354/409

FOREIGN PATENT DOCUMENTS
56-96157 6/1981 Japan .................. 354/409

Primary Examiner—John Gonzales
Assistant Examiner—David M. Gray
Attorney, Agent, or Firm—Toren, McGeady and Stanger

[57] ABSTRACT

In the disclosed auto-focus camera a focus detection system responds to light outside the range of wavelengths forming the camera image to produce an in-focus signal, and a drive signal generator that responds to the in-focus signal corrects the focusing for deviations based on the difference between the wavelength of the intended light and the imaging light.

1 Claim, 11 Drawing Figures

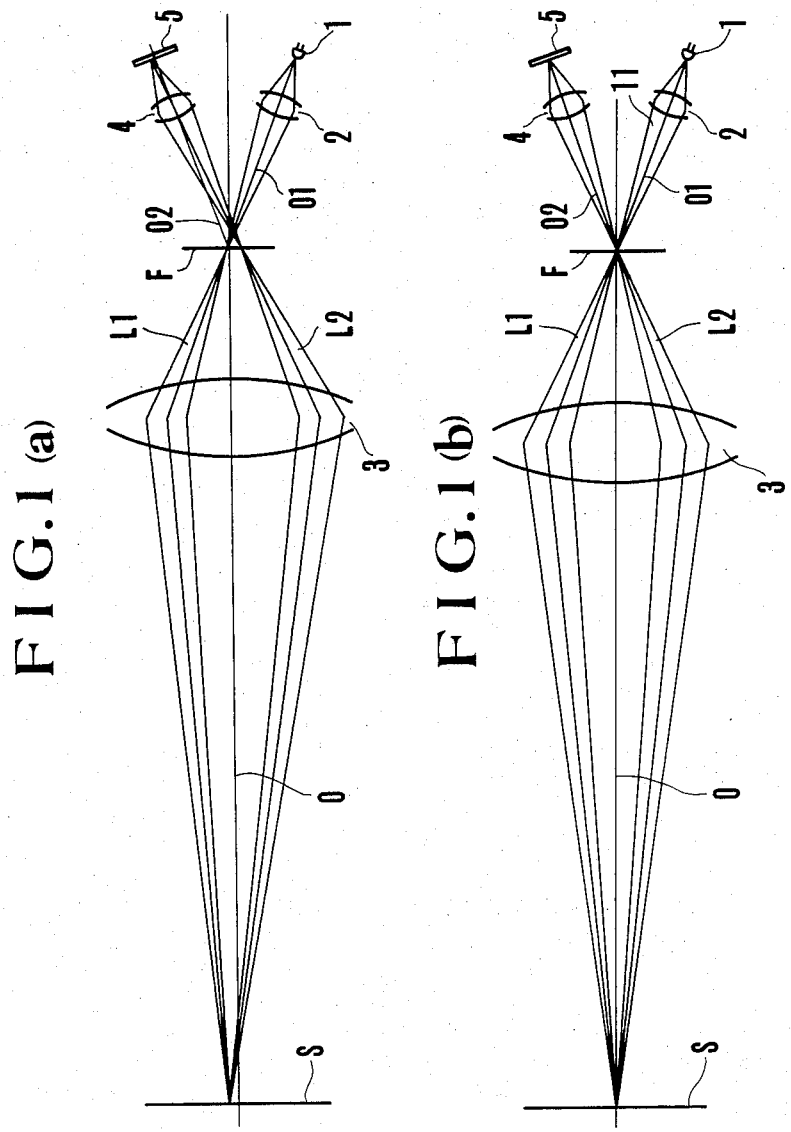

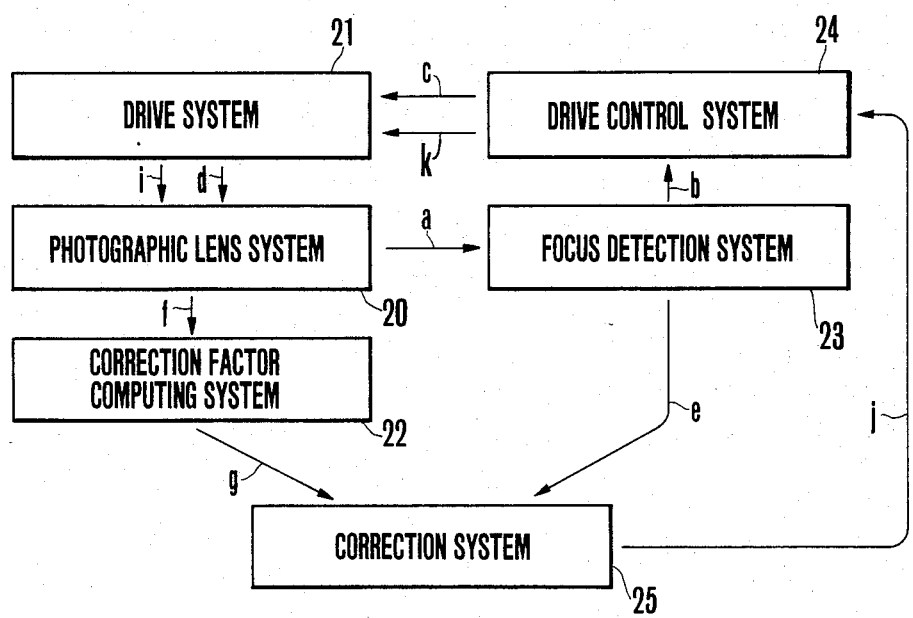
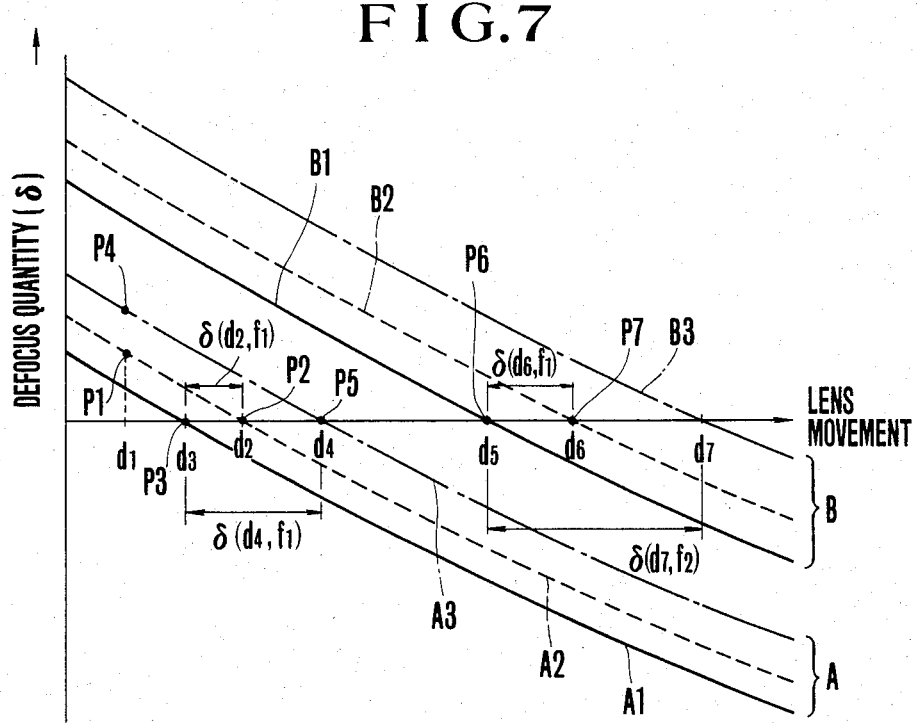

AUTO-FOCUS CAMERA

BACKGROUND OF THE INVENTION

1. Field of the Invention:

This invention relates to active type auto-focus cameras, and more particularly to auto-focus cameras in which the light transmitted toward the object to be photographed and received by the focusing system to focus on the object has a wavelength outside the region of the wavelengths that form the photographic image.

2. Description of the Prior Art

Prior art cameras may focus by projecting light from a light-emitting element in the camera onto an object to be photographed. They may automatically measure the degree of sharpness of images in television cameras, video cameras, or still cameras. When such cameras use visible light as the range-finding beam they have the disadvantage of forming an image of the visible-light-emitting element on the film plane.

Several such active focus detecting methods have been proposed using a region of wavelengths, such as infrared light to which the film is insensitive.

However, the use of infrared light as a range finding beam sometimes lowers the accuracy of the focus detection because chromatic aberrations of the objective lens produces a difference in the in-focus positions as measured by infrared light and that suitable for photographic light. This is especially so when detecting the focus by projecting the infrared light through the objective lens onto the object to carry out the in-focus detection. The influence of the chromatic aberration of the objective lens is then no longer negligible.

The principles of this TTL active system are depicted in FIGS. 1(a) to 1(c). In FIG. 1(a), a projection lens system 2 for projecting light from a light source 1 has an optical axis 01 inclined to an optical axis 0 of an objective lens 3, and also an optical axis 02 of a light receiving lens system 4 inclined thereto. A light bundle L1 emanating from the light source 1 after having been focused primarily on a plane F conjugate to the film surface by the projection lens system 2, is projected by the objective lens 3 on an object to be photographed S. Then, the reflected light L2 from the object S is focused by the objective lens 3 to form a primary image at or near the plane F and then by the light receiving lens system 4 to form a secondary image on a sensor 5.

With such an arrangement, when the objective lens 3 is in-focus on the object S, as illustrated in FIG. 1(b), the projected light L1 hits the object S at its center, and, therefore, the light reflected through the objective lens 3 and collection lens system 4 forms the secondary image at a central portion of the image receiving surface of the sensor 5. On the other hand, when out of focus, the target point of the projection light L1 on the object S is shifted upward or downward from the center, with the result that the secondary image with the reflected light L2 by the objective lens 3 and the collection lens system 4 changes its position on the image receiving surface of the sensor 5 depending upon the respective condition of the near or far focus as illustrated in FIGS. 1(a) and 1(c) respectively. Therefore, the use of a line sensor consisting of two photo-sensitive elements as the sensor 5 provides the possibility of discriminating between each condition of focus, e.g. the in-focus, near focus and far focus conditions, when the positions of the secondary images on the respective sensor elements relative to each other is detected.

The above-described TTL active method is, thanks to the involvement of the objective lens 3 in the range-finding process, free from parallax, and also allows the objective lens to be interchanged. It further assures accurate and reliable control of the operation even when the brightness of the object S is low.

However, such a statement appears to be valid provided that the wavelength of the range-finding light beam L1 does not deviate far from the main region of wavelengths contributing to the photograph. Otherwise, for example, when the wavelength of the projection light L1 lies in the infrared region, since the objective lens 3 generally has chromatic aberrations, a discrepancy will arise between the detected and actual focusing positions. Even in such a case, if that discrepancy has a specific value, it is necessary only to set up an optical arrangement that shifts the primary focal plane F' for the range-finding light beams L1 and L2 at the time of establishment of the in-focus condition by a distance, $a$, with respect to the conjugate plane F to the film surface, as shown in FIG. 2. In single lens reflex cameras where as the objective lens can be interchanged, and the deviation varies depending on $a$, the characteristic of the lens used, such a method has been found to be incapable of affording sufficient correction.

FIG. 3 shows the relation between the amount of chromatic aberration $\Delta$ of light in the infrared region with respect to the wavelength (for example, Fraunhofer's d-line) contributing mainly to photography of an objective lens and the focal length f of the objective lens. In FIG. 3, the solid line represents focusing of the lens with the object at infinity, and the dashed line represents it with the object at a close distance. Strictly speaking, the amount of chromatic aberrations is changed lens by lens according to the tendency to chromatic aberration, active type, zoom type, or the method of evaluating the chromatic aberration. Hence all lenses do not always fall on the curves of FIG. 3. But generally speaking, the longer the focal length and the shorter the object distance, the larger the amount of chromatic aberrations tend to become. This is common to many photographic objectives. As is evident from this graph of FIG. 3, in order to allow all of these photographic lenses to be used as the objective lens of the TTL active system, despite a certain depth of focus is taken into account, some correction must be made.

SUMMARY OF THE INVENTION

A first object of the invention is to provide a device capable, despite use of interchangeable lenses of chromatic aberrations different from each other, of automatically correcting the focusing position in response to the individual respective chromatic aberration of each interchangeable lens without the need for manual correcting operation for each interchangeable lens.

A second object of the invention is to provide a device having information means representative of particular chromatic aberrations for individual interchangeable lenses, wherein when the interchangeable lens is attached to a camera body, the particular information is transmitted into the camera body, so the amount of forward movement, or the position, of the focusing lens member in the interchangeable lens is corrected through a correcting mechanism.

BRIEF DESCRIPTION OF THE DRAWINGS

FIGS. 1(a) to 1(c) and 2 are schematic diagrams illustrating the shift of the image as the region of wavelengths of the range-finding light differs from that of wavelengths of the photo-taking light.

FIGS. 5, 6 and 8 are block diagrams illustrating the flow of signals in respective embodiments.

FIGS. 7 and 9 are graphs illustrating the relationships between the defocus amount ($\delta$) and the amount of forward movement (D) of the lens.

DESCRIPTION OF THE PREFERRED EMBODIMENTS

Figure 4:
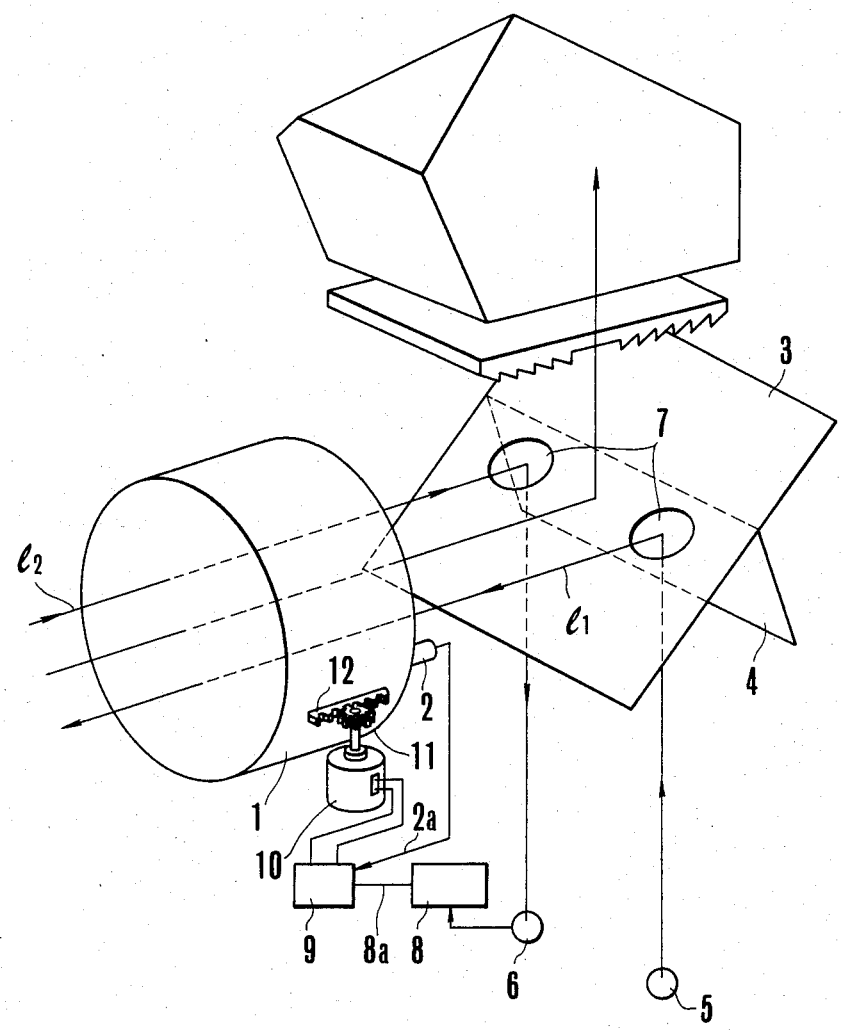
FIG. 4 is a schematic perspective view illustrating one embodiment of the invention.

FIG. 4 illustrates one embodiment of the invention. In the drawing, member 1 is an objective lens; 2 a focusing information transmitting means including a mechanical member or pin; 3 is a movable mirror; 4 is a sub-mirror born on the movable mirror 3; 5 is a light emitting element radiating a range-finding light beam; 6 is a light-sensitive element for in-focus detection; 7 are apertures in the movable mirror either to totally or partially transmit visible light, or in a dichroic form to transmit only infrared light while reflecting visible light; 8 is an in-focus signal generating device for performing in-focus detection to produce an in-focus information; 9 is a drive signal generating device for driving a drive device 10 to move the interchangeable lens 2 a given amount after the difference of the in-focus position is adjusted by taking into account the signal from the in-focus signal generating device 8 and the signal from the in-focus information transmitting means 2.

In the above-described construction, the in-focus detection light-emitting element 5 emanates light, for example, infrared light, in the form of a light beam 11 passing through the objective lens 1 to hit an object to be photographed (not shown). The reflected light 12 from the object passes through the objective lens 1 and off the half-mirror 7 to impinge on the light-sensitive element 6.

The light received by the photo-sensitive element 6 is photo-electrically transformed by said light-sensitive element and sent to the in-focus signal generating device 8.

The in-focus signal generating device 8 receives and responds to the signal from element 6 to compute how much the objective lens 1 is to be moved to establish the condition of sharp focus.

The information pin 2 is provided on the confronting surface of the amount member of the interchangeable lens barrel including the objective lens 1 to the camera body, the information pin 2 setting up a length from the confronting surface depending upon the kind of the objective lens 1. The length of the above-described information pin 2 is to represent the amount of correction for the chromatic aberrations characteristic of the kind of the objective lens 1.

When the objective lens with the information pin 2 is attached to the camera, the drive signal generating means 9 in the camera body receives an electrical signal corresponding to the length of the aforesaid information pin. For example, responsive to the length of the information pin 2, a slider of a variable resistor in the camera body slidingly moves across a series of resistance patches, to select a resistance value related to the length of the pin 2, so that a voltage or current representing the chromatic aberration of the objective lens 1 is applied as the correction information to the drive signal generating means 9.

The drive signal generating means 9 receives, in addition to the aforesaid chromatic aberration correction information based on the length of the information signal pin 2, other information signal 8a representing the focusing movement determined by the photo-sensitive element 6 receiving the range-finding beam of light in the infrared region.

Responsive to the aforesaid two information signals 2a and 8a, the drive signal generating means 9 computes a true lens movement value for achieving an in-focus condition of the objective lens 1 based on the aforesaid two information signals.

The lens movement value is sent to drive means comprising a motor 10, pinion 11 and rack 12, so as to control the amount of movement of the objective lens.

Figure 1C:
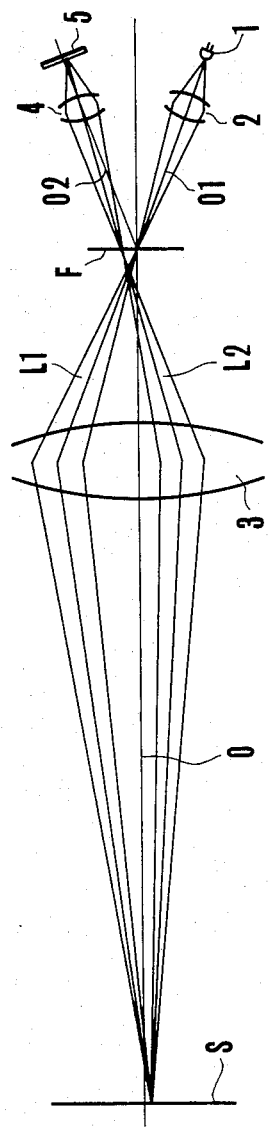
Figure 2:
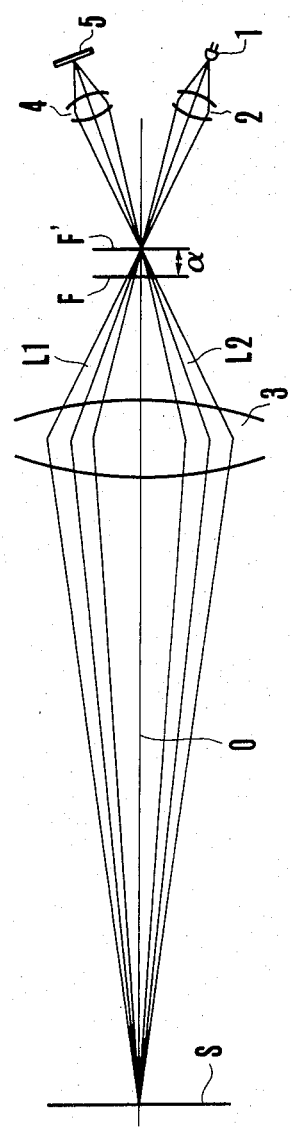
Figure 3:
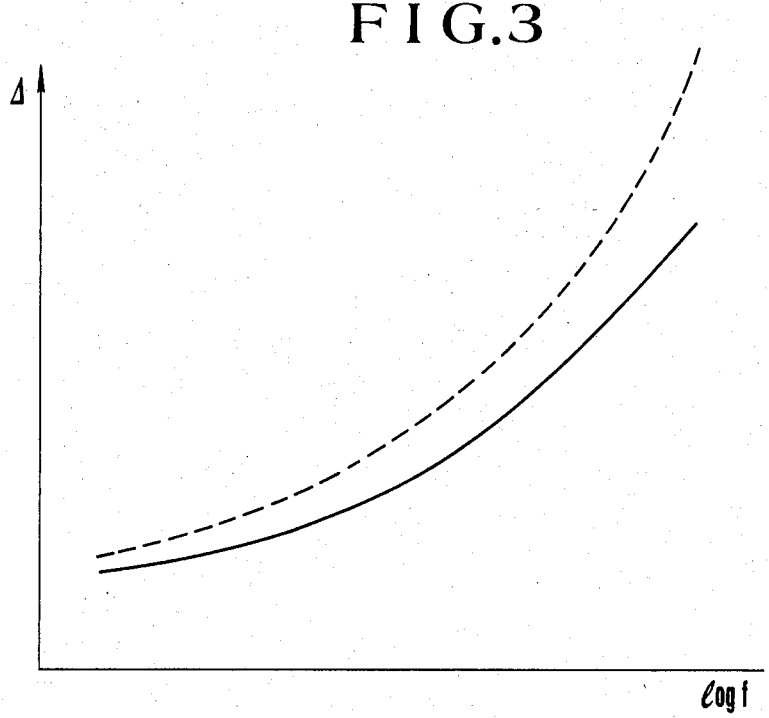
FIG. 3 is a graph of curves illustrating the relation of the chromatic aberration, $\Delta$, for infrared light with the focal length, f.
Figure 5:
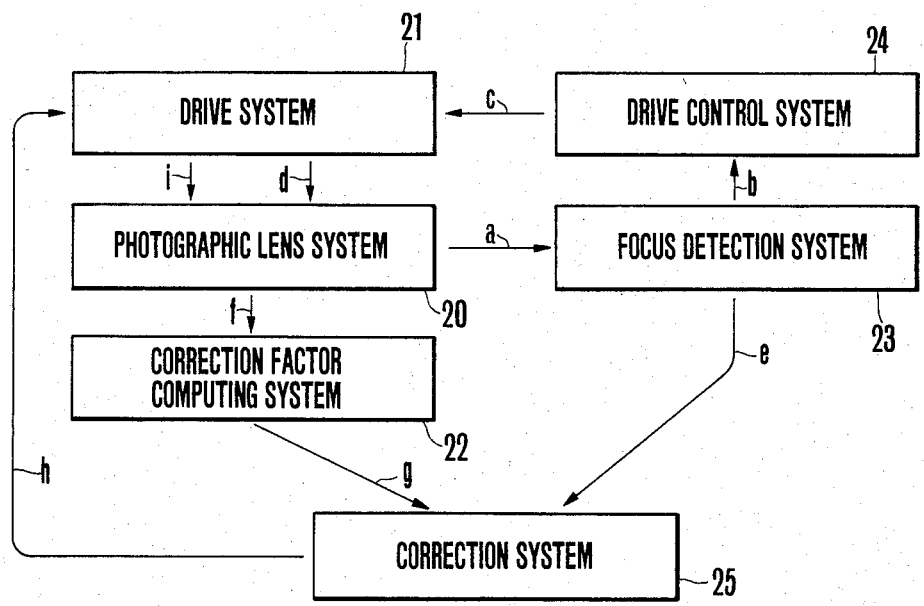

FIG. 5 is a block diagram illustrating another embodiment employing the focus correction means, comprising a photographic lens system 20, a photographic lens drive system 21 for focusing the photographic lens system 20, a correction factor computing system 22 for computing the amount of correction by the focusing position and zooming position informations of the photographic lens system 20, a focus detection system including a sensor receptive of a light beam from the photographic lens system 20, a drive control system 24 for producing a signal for controlling the photographic lens drive system 21, and a correction system for producing a signal necessary for the correction.

In FIG. 5, the operation until the detection of the sharp focus goes on in the following steps:

(1) A light beam, a, obtainable from the photographic lens system 20 is received by the focus detection system 23.

(2) The focus detection system 23 determines whether or not the in-focus condition is formed on the basis of the above-described principles of focus detection. When in the out-of-focus condition, a signal, b, representing the side on which the in-focus condition lies, or the amount of defocus is transmitted to the drive control system 24.

(3) The drive control system 24 in response to the obtained out-of-focus signal, b, sends a control signal, c, to the photographic lens drive system 21.

(4) The photographic lens drive system 21 in response to the control signal, c, drives the photographic lens system 20 with a drive control signal, d.

(5) After the steps (1) to (4) are repeated, when the in-focus condition is established, the focus detection system 23 stops sending the out-of-focus signal, and instead transmits an in-focus signal, e, to the correction system.

(6) The correction factor computing system 22 responds to the chromatic aberration information and the focal length of the photographic lens system 10 and, in the case of the zoom lens, information, f, such as the zooming position, and computes the amount of correction, g, which is transmitted to the correction system.

(7) The correction system 25 responds to the in-focus signal, e, obtained in step (5) receives the signal, g, representing the correction factor from the correction factor computing system 22, and produces a correction drive control signal, h, corresponding to the correction factor, g, which is then transmitted to the photographic lens drive system 21.

(8) The photographic lens drive system 21 carries out a correction drive, i, of the photographic lens system 20 by the necessary distance according to the correction drive control signal, h.

By the foregoing process, it is possible to bring the photographic lens system 20 to the corrected in-focus position. It is to be noted in connection with FIG. 5 that the drives, d and i, are depicted separately for better understanding, but are essentially the same in the sense that the photographic lens system 20 is driven.

Also in FIG. 5, though the correction drive control signal, h, produced from the correction system 25 is directly transmitted to the lens drive system 21, this may be otherwise sent via the drive control system 24 to the photographic lens drive system 21. FIG. 6 shows the flow of the signals in that case, wherein the in-focus signal, e, and the correction factor signal, g, are applied to the correction system 25 which then produces a correction signal, j. The drive control system 24 responsive to this signal, j, produces a correction drive control signal, k, which is then applied to the photographic lens drive system 21. Thus, the correction drive is finally performed to establish the condition of sharp focus.

FIG. 7 depicts the foregoing process to the establishment of a sharp focus in connection with a zoom lens, wherein the ordinate is the amount of defocus, and the abscissa is the amount of forward movement of the lens. In the ordinate, the upper section corresponds to the near focus, and the lower section to the far focus. Curve groups A and B represent two different object distances La and Lb (La>Lb) respectively. In each curve group the solid lines A1 and B1 represent the variations for Fraunhofer's d-line, for example; dashed lines A2 and B2 the variations for the infrared line when the focal length is f1; and dot-and-dash lines A3 and B3 the variation for the infrared light when the focal length is f2 (wherein f2>f1).

First assuming that the object distance is La, the focal length is f1 and the amount of movement of the photographic lens system 20 is d1, then the process to the condition of sharp focus is as follows. It is at the point P1 of the initial state that the fact of near focus assumed to be is detected. As a result, in the above-described process, the photographic lens system 20 is moved forward. Therefore, the point P1 representing the defocus condition directs downward along the dashed line. At the cross point P2 with the abscissa, the in-focus condition for the infrared light is detected, so the photographic lens system is stopped once. The resultant forward movement, d2, and the focal length f1 are combined by the correction factor computing system 22 to determine a distance, δ, to be corrected. Then the photographic lens system 20 is moved rearward by this distance, δ. At the point P3 representing the in-focus position for the d-line, the photographic lens system 20 stops. Also when the focal length is set longer than f1, or at f2, a variation such as illustrated by the dot-and-dash line A3 occurs so that the point P5 separated from the point P4 by the distance d4 is reached. Here, the rearward movement by the correction factor, δ(d4, f2), follows, and the photographic lens system 20 stops in the normal in-focus position, d3.

Further, in the case of the object distance Lb (>La), the curve group B defines that relationship so that, also similarly the objective lens system 20 is also set to the normal in-focus condition after the forward movement d5 has been carried out according to the correction factor δ(d6, f1), δ(d7, f2) wherein d6 and d7 represent the forward movements of cross points P6 and P7 of the curves B2 and B3 with the abscissa.

Figure 8:
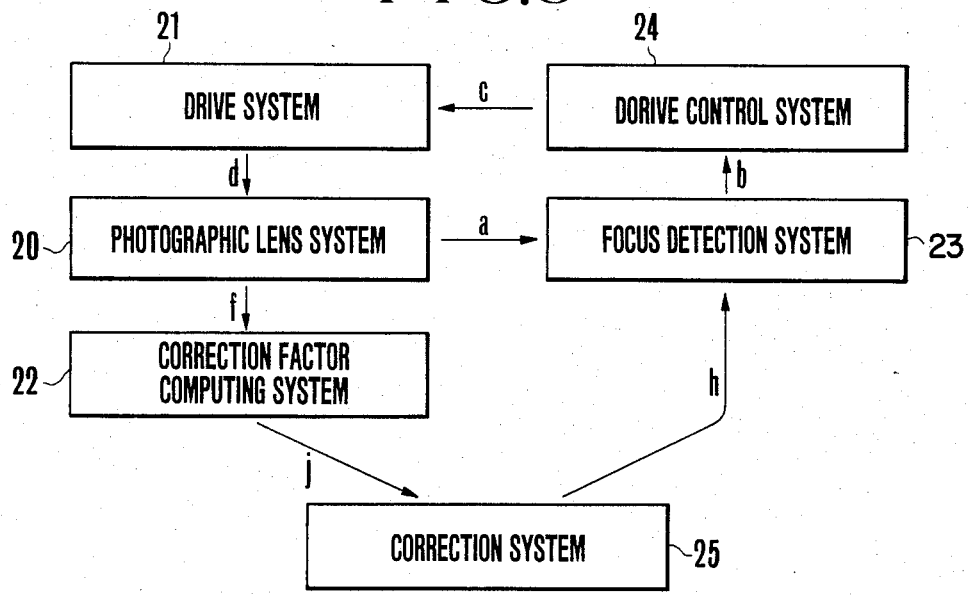

With the foregoing focus correction means, after the in-focus position for the infrared light has once been detected, the value of the correction factor is computed. Therefore, the photographic lens system 20 is moved discontinuously. To avoid this, correction means such as follows may be employed. FIG. 8 is a block diagram of that correction means. Here the same reference numerals have been used to denote the parts similar to those shown in FIGS. 5 and 6. This system is different from the foregoing one in that in the process of the correction system 25 to the in-focus condition, the signal, g, of the correction factor is always received so that by the correction signal, i, corresponding to that value of correction factor, δ, the in-focus detection is performed under the condition that the correction has been effected within the focus detection system 23.

In this case, as a concrete method of correction performed in the focus detection system 23, mention may be made of, for example, for the focus detection system 23 in the form of a line sensor, the previous electrical shift of the position of the received light beam L2 as discriminated to be the in-focus condition on the line sensor, from the central portion by a distance corresponding to the correction signal, i. Thereby, the received light beam L2 is discriminated as the in-focus when it falls in a deviated position toward the near focus rather than when it falls in the center of the sensor as the normal in-focus is considered to take place in the central position. Also in the case of using the different type sensor, the correction is effected by moving the sensor mechanically in a direction perpendicular to the optical axis of the light receiving lens system by a distance corresponding to the correction signal, 1.

Figure 9:
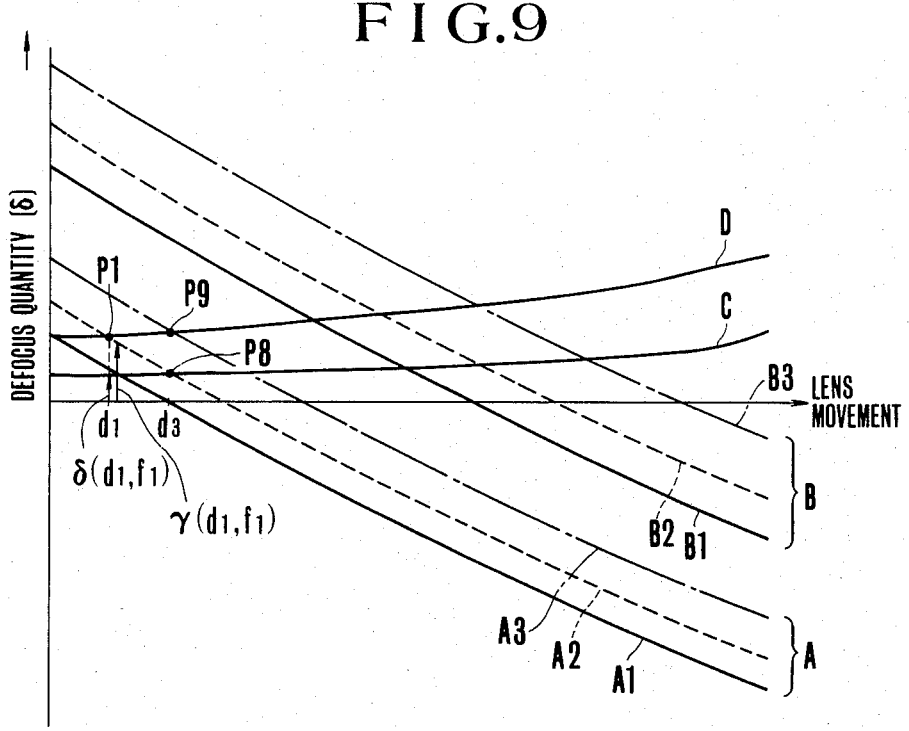

FIG. 9 represents the process of going to the in-focus condition by that system in the form of a graph similar to that in FIG. 7. In FIG. 9, though the coordinate axes and the curve groups A and B are defined similarly to those in FIG. 6, curves C and D represent the variations of the values of the correction factor, δ, produced from the correction factor computing system 22 with the forward movement, d, when the focal length is f1 and f2 (f1<f2) respectively. Similar to the foregoing case, the focal length of f1, the object distance of La and the initial amount of forward movement of the photographic lens system 20 at d1 lead to the in-focus condition through the following procedure.

At the initial position or point P1 of the photographic lens system 20 the value of correction factor, δ'(d1, f1) produced from the correction factor computing system 22 is smaller than the defocus amount γ(d1, f1). Thus the existence of the near focus condition is detected by the focus detection system 23 so that the photographic lens system 20 is moved forward. As this goes on, the point P1 moves along the curve A2, while the value of correction factor, δ, changes upward along the curve C. At the point P8 at which the two curves intersect each other, as the amount of forward movement, d3, has been done, the condition of sharp focus is detected. Within the focus detection system 23, concretely speaking, the value of correction factor, δ', and the defocus amount, γ, are electrically compared with each other to put the above-described operation into practice. It is to be noted that the defocus amount, γ, is what can be sought from the position of the received light beam L2 on the sensor.

When the focal length of the photographic lens system 20 changes to f2 (>f1), the curve representing the value of correction factor, δ, takes its place at D. If the object lies at the same distance La, the amount of forward movement to the position d3 corresponding to a point P9 at which the two curves A3 and D intersect each other results in establishing the condition of sharp focus. Also the change of the object distance to Lb (>La) leads to detect the in-focus condition in exactly the same manner.

The following is an explanation of a practical method of computing the values of the correction factor, δ and δ' in the computing system 22. Since the values of the correction factor, δ and δ', vary with the amount of forward movement, d, and the focal length, f, it is first necessary to detect these variables. For this purpose, the moving parts of the photographic lens system 20, for example, the distance adjusting ring and the zoom ring, are provided with electrical probes to seek their angular positions electrically, as the determination of the variables, d and f, from these electrical signals can be made relatively easily. It is possible to compute the values of the correction factor, δ and δ', by using the given values d and f, if the functions δ(d, f) and δ'(d, f) are of simple form, with electrical elements having the computing function. It is also possible to use a memory element such as ROM in storing all values of the correction factor, δ and δ', related to certain combinations of values of the variables d and f, so for the given values of the d and f, the required values of the correction factor, δ and δ', are readily read out. In actual practice, there is no need to compute the correction factors, δ and δ', continuously in correspondence to the continuous changes of the variables d and f, and a number of scattering values of the correction factors, δ and δ', related to discrete values of the variables d and f in combination suffice for the actual purpose. When computing the correction factors, δ and δ', without recourse to the determination of the values of the variables d and f, the position informations of the distance adjusting ring and zoom ring may be put directly into the reader of the computing system.

As has been described above, according to the automatic focus camera of the invention, the focusing movement of the photographic lens and its focal length can be taken into account in correcting the focusing position. Therefore, in application to the focus detection by the TTL active system using light of a different wavelength region to that of the light contributing mainly to photography, for example, infrared light as the range finding beam, the in-focus detection accuracy can be greatly improved. Even in interchangeable lens type cameras such as single lens reflex cameras, an effective correction can be achieved according to each kind of interchangeable lens, and further even particular objective lenses having special chromatic aberrations can be utilized as well.

What I claim:

1. An automatic focus camera comprising:
A. detecting means for receiving light passing through an interchangeable lens and and for detecting an in-focus position of the lens,
said light for detection of the in-focus position being in a different wavelength region from an image forming light focused on a light-sensitive material through the objective lens;
B. signal receiving means for receiving a signal from an interchangeable lens,
said signal receiving means for producing chromatic aberration correction information as an electric signal representing a wavelength region of the interchangeable lens;
C. in-focus signal generating means for producing an in-focus signal on the basis of a signal from said light-receiving means; and
D. drive signal generating means responsive to the in-focus signal and the chromatic aberration correction information, for producing a signal to move said objective lens to the in-focus position that has been corrected for deviation based on the difference between the aberrations of the in-focus detecting light and the image forming light;
E. drive means for driving the objective lens to the in-focus position on the basis of the output signal of the drive signal generating means.

* * * * *